Sept. 25, 1951 H. M. VEAUX 2,568,779
MULTIPLEX SYSTEM FOR TELEGRAPHIC AND RADIOTELEGRAPHIC
TRANSMISSION WITH DECAMETRIC WAVES
Filed Aug. 13, 1948 2 Sheets-Sheet 1

INVENTOR
HENRI MAURICE VEAUX
BY
R. P. Morris
ATTORNEY

INVENTOR
HENRI MAURICE VEAUX
BY
R P Morris
ATTORNEY

Patented Sept. 25, 1951 2,568,779

UNITED STATES PATENT OFFICE 2,568,779

MULTIPLEX SYSTEM FOR TELEGRAPHIC AND RADIOTELEGRAPHIC TRANSMISSION WITH DECAMETRIC WAVES

Henri Maurice Veaux, Saint-Leu-la-Foret, France

Application August 13, 1948, Serial No. 44,195
In France August 14, 1947

4 Claims. (Cl. 250—9)

Figure 1:
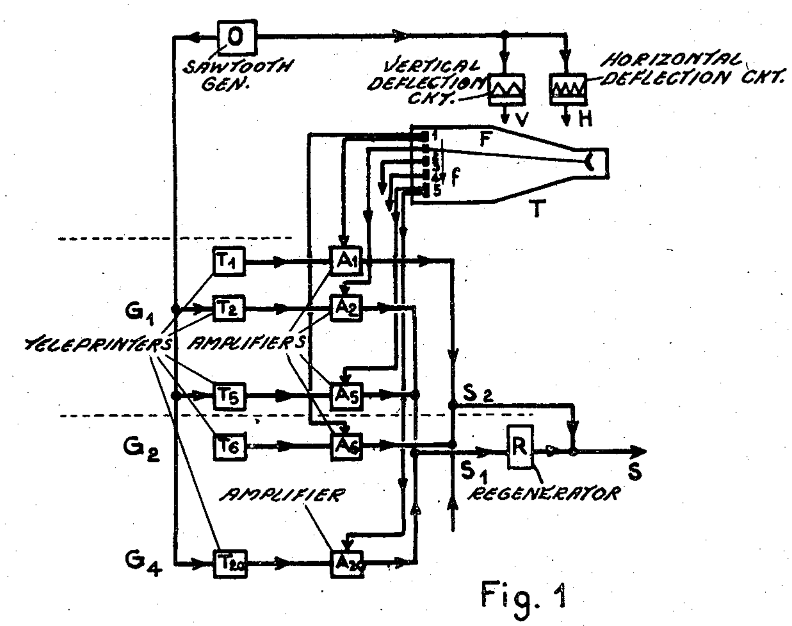

This invention relates to a multiplex high speed telegraph system with time distribution allowing the reverberation and echo effects to be avoided in a radio electric transmission and the influence of static disturbances to be limited. This system, used for supplying several channels, using conventional telegraphic apparatus, having a low rate (teleprinters for instance), presents a great flexibility in operation by adapting itself by an easy adjustment to the variable conditions of propagation, and to its use in wire transmissions.

It is well known that in a long distance radio electric transmission by decametric waves, the signals arrive at the receiving station by paths having different lengths. The transmission of a short pulse gives at the receiving end a train of pulses producing the well known reverberation phenomenon. The same propagation mechanism explains the well known phenomenon called selective fading in radio telephony; the experimental results show that on a Europe-U. S. link the difference in time for the two shortest paths is in the order of 1 millisecond. It is known also that a train of short pulses transmitted at regularly spaced intervals, the duration of which is greater than the reverberation time, does not produce, at the receiving end, heads of signals succeeding according to the same order of regularity, and this is explained by the changes between two successive pulses of the propagation conditions on the shortest path.

The present invention is based on the following principles:

(1) If a train of signals is transmitted with a duration of less than the difference in the travel times $\theta1$ along the two shortest paths (that is, 1 millisecond in the above mentioned example), a true reproduction of the signals is obtained at the receiving end by receiving the only train arriving first along the shortest path: the transmission must be effected discontinuously by successive trains having a duration less than $\theta1$, spaced apart by time intervals corresponding at the receiving end to the reverberation signals which are not required;

(2) The first train gives a true reproduction of the signals particularly as concerns the phase relations; the time interval $\Delta t$ separating two signals of the same train tends to be maintained during the propagation when $\Delta t$ becomes very short; the transmitting frequency thus offers substantially only slight changes due to the propagation.

In radio telegraphy however, the practical realisation is simplified because it is not necessary to effect the storage of the signals for transmission with a duration conversion at the transmitting end followed by a reverse duration conversion at the receiving end; this leads to the realisation of multiplex radio telegraphic high speed systems comprising several channels exploited for instance, by teleprinters; such systems which are relatively simple suppress in practice the reverberation and echo effects and give a very efficient protection against interference; they adapt themselves with the desired flexibility to the variable conditions of the propagation and to the wire transmission.

The invention consists in the provision of such systems wherein each train comprises reference elements for amplitude or phase; it allows the method of telegraphy used in UHF transmission to be applied to the decametric waves transmission by limiting the transmission to discontinuous trains separated by times allotted to the reverberation effects which do not exist in UHF constituents.

In a first system the transmitting telegraph devices (teleprinters for instance) are assembled in $n$ identical groups comprising each N devices; during a time equal to the telegraphic time identical for the various channels, the N$n$ channels are scanned in periods of equal duration $\theta1$ separated by free intervals, the scanning by the train corresponding to a group; the scanning duration $\theta1$ of one group is less than the time interval (1 millisecond for instance) which separates the arrival at the receiving end of a same signal transmitted along the two shortest paths and the duration $\theta2$ which separates the end of the scanning of a group from the beginning of the scanning of the following group is greater than the practical reverberation time; at the receiving end, the signals of a same train arriving along the shortest path are collected and transfered to the corresponding telegraph receivers; the duration of a telegraphic time identical for the various channels (i. e. 20 milliseconds for a teleprinter) represents the sum of the scanning times for the $n$ channels and intervals between channels; it is therefore equal to $n\ (\theta1+\theta2)$.

T is given by the telegraphic device used and is not a practical setting element; but according to the conditions of propagation or the conditions of interference in transmission, the other elements may be adjusted: since $n$ and $(\theta1+\theta2)$ are constant, the respective durations of $\theta1$ and $\theta2$ are adjusted as desired according to the reverberation conditions; an increase in $\theta1$ when the reverberation effect is reduced diminishes the transmission band occupied by the transmission. For a wire transmission, $\theta2$ is set to value 0.

Figure 2:
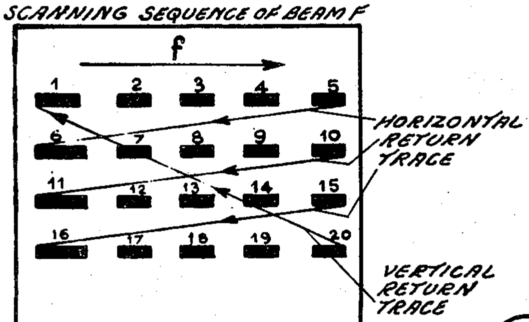
Figure 3:
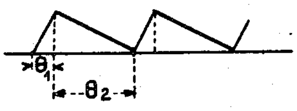
Figure 4:
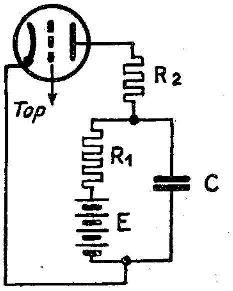
Figures 5, 6:
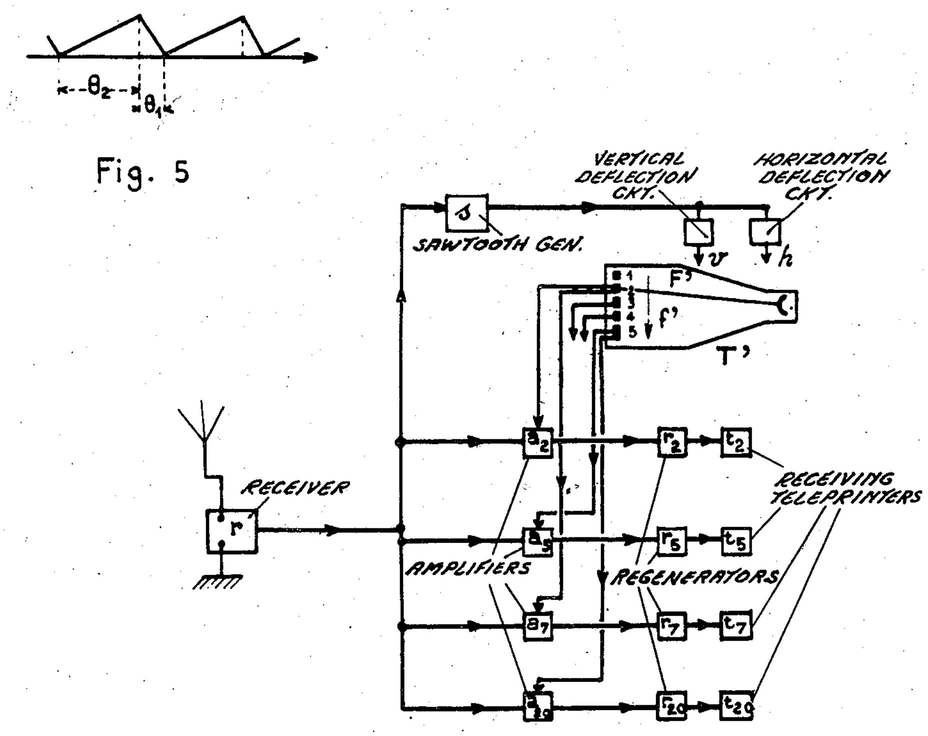
Figure 7:
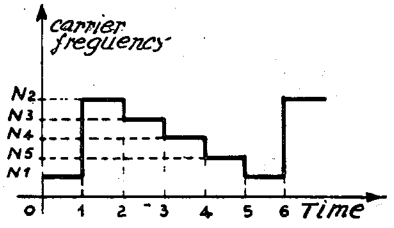

A more thorough understanding of the present invention may be had from the following detailed description and the accompanying drawings, in which Figures 1, 4 and 6 are schematic diagrams of an embodiment of my invention; Figure 2 is a diagrammatic representation of the scanning sequence used and Figures 3, 5 and 7 are graphical aids to the understanding of the operation of the invention.

The following embodiment given as illustration will eliminate all doubt as to the object of the invention: The system shown in Fig. 1 for the transmission, and Fig. 6 for the reception, corresponds to a transmission comprising 16 teleprinters having a transmission speed normalised to 50 bauds; the scanning of a telegraphic time on the 16 channels is made, as is well known, by interleaving in a time equal to 20 milliseconds; for the scanning the teleprinters are distributed into four groups of four devices according to Fig. 1. The various groups comprise the teleprinters (T2, T3, T4, T5) (T7, T8, T9, T10) (T12, T13, T14, T15) (T17, T18, T19, T20); in normal operation, sources T1, T6, T11 and T16, produce synchronising signals used as reference signals in the transmission of a signal time. The beam F of an electronic switch T sweeps according to the method well known in television (Fig. 2) four horizontal lines, each comprising five contacts (1 to 5) (6 to 10) (11 to 15) (16 to 20). The first contact of each line i. e. 1, 6, 11, 16, unlocks the amplifier A1, A6, A11, A16, supplied from the permanent sources of synchronising signals T1, T6, T11, T16, which may be reduced to a single source, the action of which is controlled by the contacts 1, 6, 11 and 16, and the duration of the sweeping of a line is adjusted to a time $\theta 1$ less than the duration separating the travel times along the two shortest paths; the time $\theta 2$ from the end of a swept line to the origin of the next line as well as the time of transit from contact 20 to contact 1 being greater than the practical reverberation time. The passing of the beam F on the four contacts of a same line following the first one (i. e. 2 to 5 for the first line) successively unblocks the amplifiers A2 to A5, which are fed by the teleprinters T2 to T5. Fig. 1 shows only a part of the teleprinters distributed into four groups G1, G2, G3 and G4. The amplifiers fed by the teleprinters have a common output S1 from which a signal regenerator R is fed, this regenerator being of a known type in interleaved scanning; said regenerator gives at its output a signal continuity at the arrival of two successive marking pulses from 2 successive channels, the return to rest resulting from a space or from the end of a line scanning. In the case of the end of a line, the control of R for return to rest may be effected by sweeping of a supplementary brush, the sweeping time of which is comprised in the time $\theta 2$ imposed by the reverberation effect. The synchronising signals obtained at S2 are intermixed with the signals from R to give at S the current used for the electronic keying of the transmitter. The sweeping movement of F is effected according to the method conventionally used in television; the synchronism and the local phasing of the driving heads of the transmitter using perforated tapes and of the movement of F, give the interwoven scanning of the various channels: for this purpose, according to a well known method, a basic oscillator O gives after the required frequency changes the sawtooth potentials applied to V and H, the vertical and horizontal deflection condensers for the beam F. The same oscillator feeds the motors of the driving heads of the transmitters. For a telegraphic speed of 50 bauds (telegraphic time $T=20$ milliseconds) and a reverberation having a duration $\theta 2=4$ milliseconds, the sweeping movement of F corresponds to a duration $\theta 1=1$ millisecond for the scanning of a line, the return to the beginning of the following line being effected in a time $\theta 2=4$ milliseconds. The keying speed of the signal at S is in the order of 5000 bauds; the image and line frequencies are equal to 50 and 200 respectively.

The sweeping potentials for images and lines (Fig. 3) are obtained in accordance with the known methods. The direction of the movement of sweeping of the lines may differ from that normally used in television. One of the conventional systems for producing the saw-tooth signal shown in Fig. 4 gives the desired results: the pulses acting on the grids spaced at intervals of 5 milliseconds from the oscillator O determine the instants of the charge of C through R2, and the beginnings of the periods $\theta 1$ of line sweeping, whilst the charge times through R1 correspond to times $\theta 2$ (Fig. 5). Since the time $(\theta 1+\theta 2)$ is maintained constant at 5 milliseconds for instance, the duration $\theta 1$ of a line sweeping is determined by adjusting R2; it is thus easy to adjust $\theta 1$ from a low value to 5 milliseconds, the latter corresponding to the practical absence of reverberation. This adjustment of $\theta 1$ does not change the operation of the telegraphic transmitters, and may be effected at the request of the receiving operator according to the propagating conditions without it being perceived by the operators of the telegraphic devices or apparatus; the only result is a change in the transmission band occupied by the multiple transmission (transmission speeds equal to 1000 bauds in the absence of reverberation). Moreover, the same apparatus may be used as well for transmission by wire in which case $\theta 2=0$ as well as for radioelectric transmission by a simple adjustment of $\theta 1$. The line sweeping may be effected along horizontal lines by the use at point V of a potential comprising upward directed steps.

The signals at S must be of three kinds: the signals of R and the synchronising image and line signals; the differentiation may be effected by considering either the duration or the amplitude or the frequency. The signal from contact 1 (Fig. 2) which is different from those from the synchronising contacts 6, 11 and 16, may be simultaneously used as image and line signal; a difference in the lengths of the contacts controls the relative duration of the signals. Fig. 6 gives a schematic layout of the receiving system; the signals from receiver $r$ are separated; the synchronising signals selected at $s$ control the saw-tooth potentials which, collected at $v$ and $h$ and applied to the vertical and horizontal deflection condensers, produce the sweeping whose movement is of the beam F′ of an electronic switch T′, movement synchronised with that of beam F; during this movement the beam unblocks the 16 amplifiers $a2$, $a20$ of the 16 channels; the pulses from these amplifiers produce according to known methods the regeneration of the telegraphic signals (regenerators $r2$ to $r20$) which feed the receiving teleprinters $t2$ to $t20$.

The advantages of the system are as follows:

(1) Radioelectric advantages: the reverberation effects do not exist: the influence of the echoes may be suppressed: $\theta 2$ may in any case be so adjusted that the echoes arrive between two useful signal trains; finally the influence of the statics is reduced since the time $\theta 1$ attributed for the reception is relatively short; the bias of the input tube of the receiver may further be controlled by the line synchronizing signals in such a way that the receiver be in receptive condition only during the times $\theta 1$ necessary for receiving the useful signal trains.

(2) Flexibility of use: Since the telegraphic time $T=n(\theta 1+\theta 2)$ is constant, it is easy to adjust the time $\theta 1$ according to the propagation conditions and to employ the same apparatus on wire links if $\theta 2=0$;

Likewise it is possible to set according to the propagation and interference conditions the number N of apparatus of a same line by simply adjusting the amplitudes of the horizontal deflection of the beam F and F'; an amplitude giving a sweeping of the contacts 1 to 3 (Fig. 2) corresponds to two channels used by line; for the purpose of facilitating the settings at the transmitting and receiving ends, it is necessary to use a visual supervision constituted for instance by a cathode ray tube (not shown) arranged in parallel with the tubes T or T' and the spot of which is displaced according to a pattern reproducing the contacts 1 to 20; the coincidence of the scanning spot on the contact lines, the number of which is easily chosen, is thus obtained.

In practice, the propagation conditions on the shortest path do not present any substantial change during the $\frac{1}{50}$ second corresponding to the sweeping of an image; a single synchronising signal for each image is then necessary; only contact 1 may be used for the synchronisation; the corresponding pulse is used at the receiving end for synchronising a stable oscillator placed at *s* and which gives according to known methods the vertical and horizontal deflection potentials for the beam F'; the contacts 6, 11 and 16, may be used for different channels; only one synchronising signal for each image is then necessary for 19 channels; a simple switching system enables the passing according to the propagation conditions from the 16 channel arrangement comprising four synchronising signals for each image to the 19 channel arrangement having a single synchronising signal for each image.

The methods of supervision of the probable exactitude of the received signals, particularly by using as well known a 7 unit code, may be adapted to the system of the invention; due to the transmission quality of the system, however, the loss of two units out of 7 represents an unnecessary extravagance, and a less expensive supervision would be sufficient, said supervision being effected simultaneously on all channels or all the channels of a line and using some determined contacts corresponding to a marking or a spacing: at the receiving end, the absence of a signal on a marking contact or the presence of a signal on a spacing contact, is translated into vague signals, which attracts the attention of the operator; a line supervision may use the contacts simultaneously allotted to the synchronising signals (contacts 1, 6, 11, 16); if a supervision by channel is desired, the quality of the system enables the use of a 6 unit code.

The system enables an easy interconnection between a transmission network using underground or radio cables and a radio network using decametric waves, the discontinuous transmission decametric wave group being capable of occupying a part of the time of the continuous transmission effected on underground or radio cables.

The number of channels may be increased by changing the carrier frequency at the end of the transmission of a train occupying a line; in the above mentioned embodiment comprising a line scanning of 1 millisecond and reverberation of 4 milliseconds four five-contact lines may be inserted between two successive contact lines of Fig. 2: the complete contact pattern thus presents 20 lines which are continuously swept, the passage from the end of a line to the beginning of the following one being very rapid; this passage is accompanied by a sudden change in the carrier frequency. The 5 first lines thus produce the transmission of the 5 trains of 1 millisecond having 5 successive frequencies N1, N2, N3, N4 and N5, which are sufficiently spaced out for the reverberation effects from one line to the next one to be conveniently separated at the receiving end. The same cycle of change in the carrier frequencies may be repeated cyclically for each series of 5 lines. A telegraphic keying of the carrier frequency of the transmitter is therefore effected according to a periodic sequence having a period equal to 5 milliseconds and adapted to be controlled from the oscillator O (Fig. 1) according to the conventional method of keying by frequency shift. At the receiving end, the signals belonging to lines having the same carrier frequency may be separated by frequency selectivity. The signals of all lines may also be translated to a same intermediate frequency by keying the frequency of the frequency shift oscillator in synchronism with the changes effected at the transmitting end. In radiotelegraphy account may be taken of the rapid decrease of the reverberation by using a law of convenient variation of the carrier frequencies comprising diminution of difference from N2 to N5 (Fig.7); the whole frequency difference may thus be substantially reduced without inconvenience; the frequency difference enables the separation at the receiving end of the signals belonging to a line having the same number; therefore a re-separation of the channels belonging to a same line is effected. Due to difficulties in the manufacture of a tube having a considerable number of contacts, a group of several tubes may be used, the lines of which are successively swept during a telegraphic time according to well known methods.

Another construction of tubes T or T' may be adopted by arranging, in front of the electrodes, a plate provided with an aperture opposite each electrode; this plate has a potential slightly higher than that of the electrodes, when the beam passes through the aperture a secondary emission is produced from the corresponding electrodes, said emission being absorbed by the plate and enabling the channel unblocking pulse to be produced. At the receiving end the signals may be used for the modulation of the electronic beam by receiving the secondary emission pulses corresponding to the marking times on the channel in question on an electrode.

Other ways of using the electrode may be considered, especially the destination of the electrodes of a same line to a same channel with a code of 5 or more units, the differentiation of a character on a channel by the distance separating 2 pulses on a line intended for the said channel, or transposition of the Hughes system of keying. Hughes keying is a directly worked (as opposed to relay worked) synchronous typeprinting telegraph, having a sending keyboard containing black and white keys arranged alternately in similar fashion to a piano keyboard. The position of the key depressed determines the instant at which a current impulse is transmitted. For a full description of Hughes keying reference may be had to the text "Telegraphy," written by T. E. Herbert (fourth edition), printed by Pitman and Sons, Ltd., in Chapter XIII thereof entitled, "The Hughes."

In the case of 2 channels per line, for instance, the line comprises 4 contacts, the first of which gives the synchronising signal, and the other three enabling the characterisation of the make condition existing on the 2 channels.

The invention is not limited to the sweeping by means of parallel straight lines; a circular sweeping may be adopted for instance, by the use of a cyclophon tube normally used in UHF transmission, and conventionally employed for discontinuous transmission. It is well known that a cyclophon tube comprises a cathode beam provided with a circular movement, a plate having a number of apertures equal to the number of channels, and electrodes or dynodes, one in front of each aperture; during its rotating movement the beam passes through the apertures and strikes the electrodes with a potential less than that of the plate; there then results a secondary emission between each electrode and the plate which gives the unblocking pulse for the channel in a system having the features of the straight sweep system use may be made of a cyclophon.

What is claimed is:

1. A time multiplex telegraph system comprising a plurality of grouped telegraphic transmitters adapted to transmit "make" and "break" signals in different channels, one channel for each group, a transmission medium common to all of said transmitters having at least two paths of different lengths, means for cyclically scanning said channels, means for recording the output of said channels during a time interval equal to the time required by said scanning means to scan the said channels, means to group together the "make" or "break" signals from said channels, thereby to form trains of grouped signals, the duration of each train being shorter than the difference in the duration of times of travel of said signals over the two shortest paths of said transmission medium, means for separating said grouped signal trains by a time interval equal to the time of travel of reverberated signals through said transmission medium, means coupled to said transmission medium for receiving said signal trains, said receiving means comprising means for cyclically separating said received signal trains, a plurality of means for regenerating said separated received signals, and a plurality of means for translating said regenerated signals, said separating means adjusted to operate only during the time interval equal to the time of travel of reverberated signals through said transmission medium.

2. A time multiplex telegraph system as claimed in claim 1, wherein said transmission medium comprises the ether; said cyclically scanning means comprises a cathode-ray tube having a plurality of dynodes, one corresponding to each of said transmitters, said dynodes adapted to be swept by the cathode ray beam of said tube, and means to deflect the cathode ray beam of said tube.

3. A time multiplex telegraph system as claimed in claim 1, wherein said transmission medium comprises a wire link.

4. A time multiplex telegraph system as claimed in claim 1, wherein the cycles of operation of said scanning means and said separating means are identical.

HENRI MAURICE VEAUX.

REFERENCES CITED

The following references are of record in the file of this patent:

UNITED STATES PATENTS

| Number | Name | Date |
|---|---|---|
| 1,875,165 | Schroter | Aug. 30, 1932 |
| 2,265,216 | Wolf | Dec. 9, 1941 |
| 2,292,944 | Hudec | Aug. 11, 1942 |
| 2,453,659 | Bellescize | Nov. 9, 1948 |

FOREIGN PATENTS

| Number | Country | Date |
|---|---|---|
| 552,482 | Great Britain | Apr. 9, 1943 |